United States Patent
Müller

(10) Patent No.: US 7,401,394 B1
(45) Date of Patent: Jul. 22, 2008

(54) METHOD OF ATTACHING A FASTENER ELEMENT TO A METAL PANEL

(75) Inventor: Rudolf Müller, Frankfurt (DE)

(73) Assignee: Profil Verbindungstechnik GmbH & Co., Friedrichsdorf (DE)

( * ) Notice: Subject to any disclaimer, the term of this patent is extended or adjusted under 35 U.S.C. 154(b) by 0 days.

(21) Appl. No.: 09/029,425

(22) PCT Filed: Sep. 25, 1996

(86) PCT No.: PCT/EP96/04188

§ 371 (c)(1),
(2), (4) Date: Dec. 18, 1998

(87) PCT Pub. No.: WO97/11811

PCT Pub. Date: Apr. 3, 1997

(30) Foreign Application Priority Data

Sep. 25, 1995 (DE) ................................ 195 35 537

(51) Int. Cl.
*B23P 11/00* (2006.01)
*B23P 19/00* (2006.01)
*B21D 39/00* (2006.01)

(52) U.S. Cl. ............... 29/432.1; 29/509; 29/525.01; 29/525.05; 29/525.06; 29/525.11; 29/283.5; 29/243.5; 403/274; 403/282; 403/283; 72/470

(58) Field of Classification Search ............. 29/432, 29/432.1, 432.2, 509, 525.01, 525.05, 525.06, 29/525.11, 798, 243.5, 243.53, 283.5, 524.1; 403/274, 282, 283, 285; 72/469, 470; 411/107, 411/179, 180, 181, 183
See application file for complete search history.

(56) References Cited

U.S. PATENT DOCUMENTS

| | | | | | |
|---|---|---|---|---|---|
| 4,389,766 | A | * | 6/1983 | Capuano | 29/432.2 |
| 5,140,735 | A | * | 8/1992 | Ladouceur | 29/243.522 |
| 5,174,018 | A | * | 12/1992 | Muller | 29/798 |
| 5,423,645 | A | * | 6/1995 | Muller et al. | 411/181 |
| 5,502,888 | A | * | 4/1996 | Takahashi et al. | 29/798 |
| 6,125,524 | A | * | 10/2000 | Mueller | 29/520 |
| 6,257,814 | B1 | * | 7/2001 | Muller | 411/176 |

FOREIGN PATENT DOCUMENTS

WO    WO 9526256 A1 * 10/1995

* cited by examiner

*Primary Examiner*—Jermie E Cozart
(74) *Attorney, Agent, or Firm*—Hunton & Williams LLP; Eugene C. Rzucidlo

(57) ABSTRACT

In a method for inserting a bolt element (10) having a head portion (12) and a shaft portion (16) into a sheet metal component (52) the bolt element is passed through the sheet metal component by means of a setting head (38), with its end (100) remote from the head portion at the front, and is riveted to the sheet metal component (52) in the region of its head portion (12) by the cooperation of the setting head with a die (54) arranged at the side of the sheet metal component remote from the setting head (38). The sheet metal component (52) is pierced either by a hole punch or by the specially shaped bolt element (10), by the end of the shaft portion (16) remote from the head portion (12) under the action of the setting head (38), to form a ring collar which is subsequently deformed radially into contact with a groove in the shaft portion. In this arrangement the end (100) of the bolt element (10) which performs the punching work is preferably executed in accordance with the Ka shape of DIN 78.

18 Claims, 11 Drawing Sheets

Figure 5:
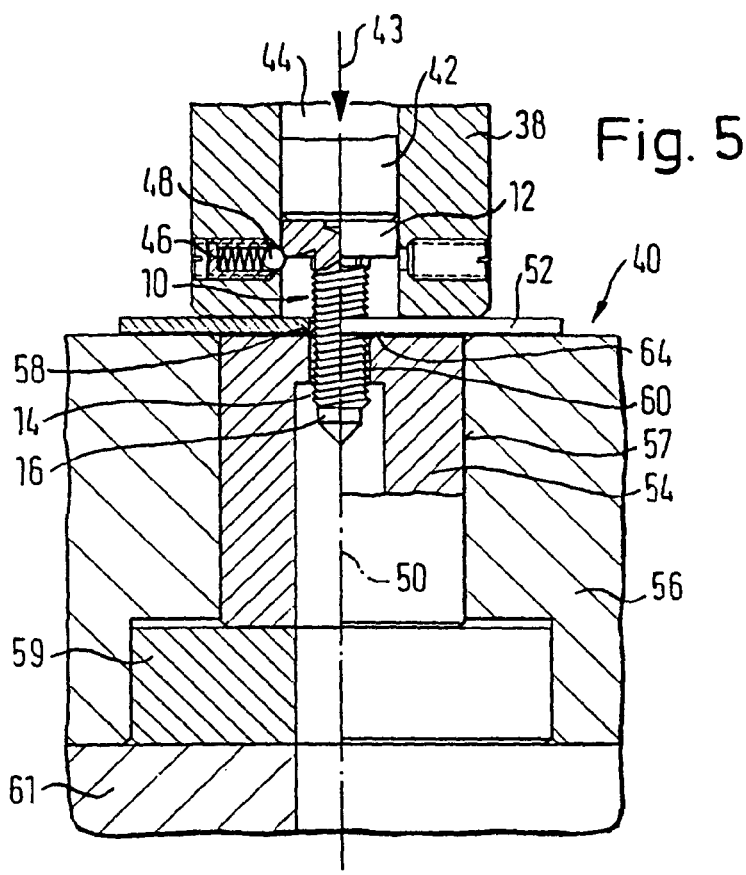

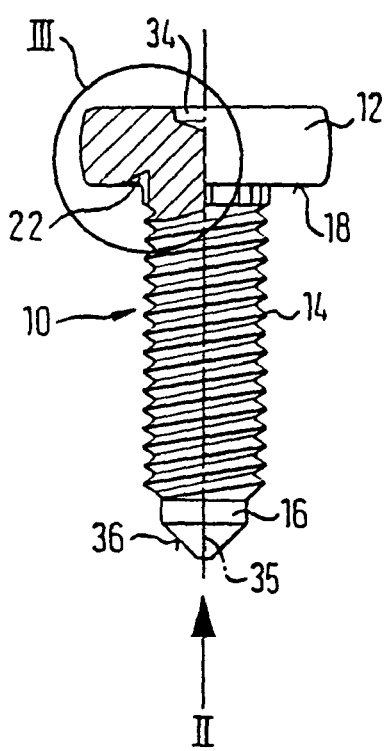
Fig. 1
Fig. 2
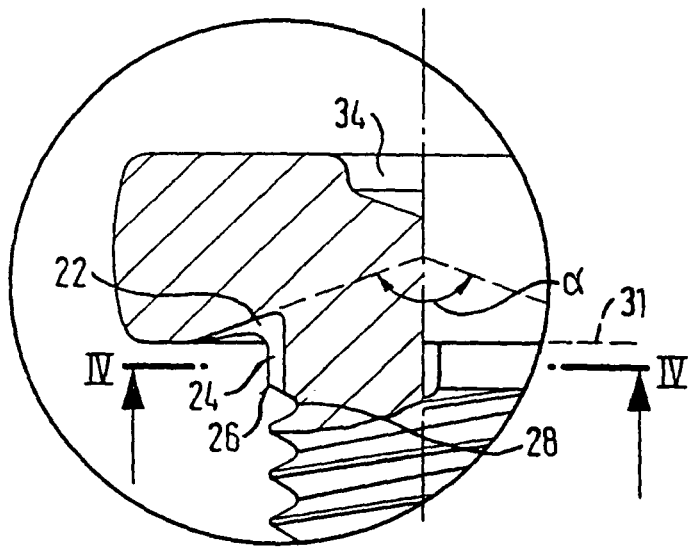
Fig. 3
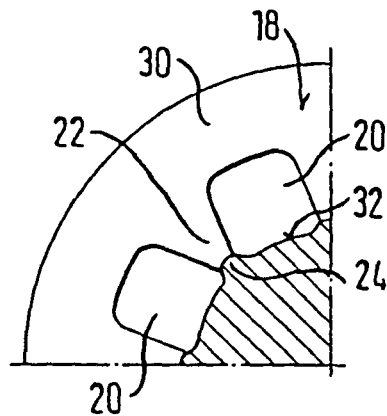
Fig. 4

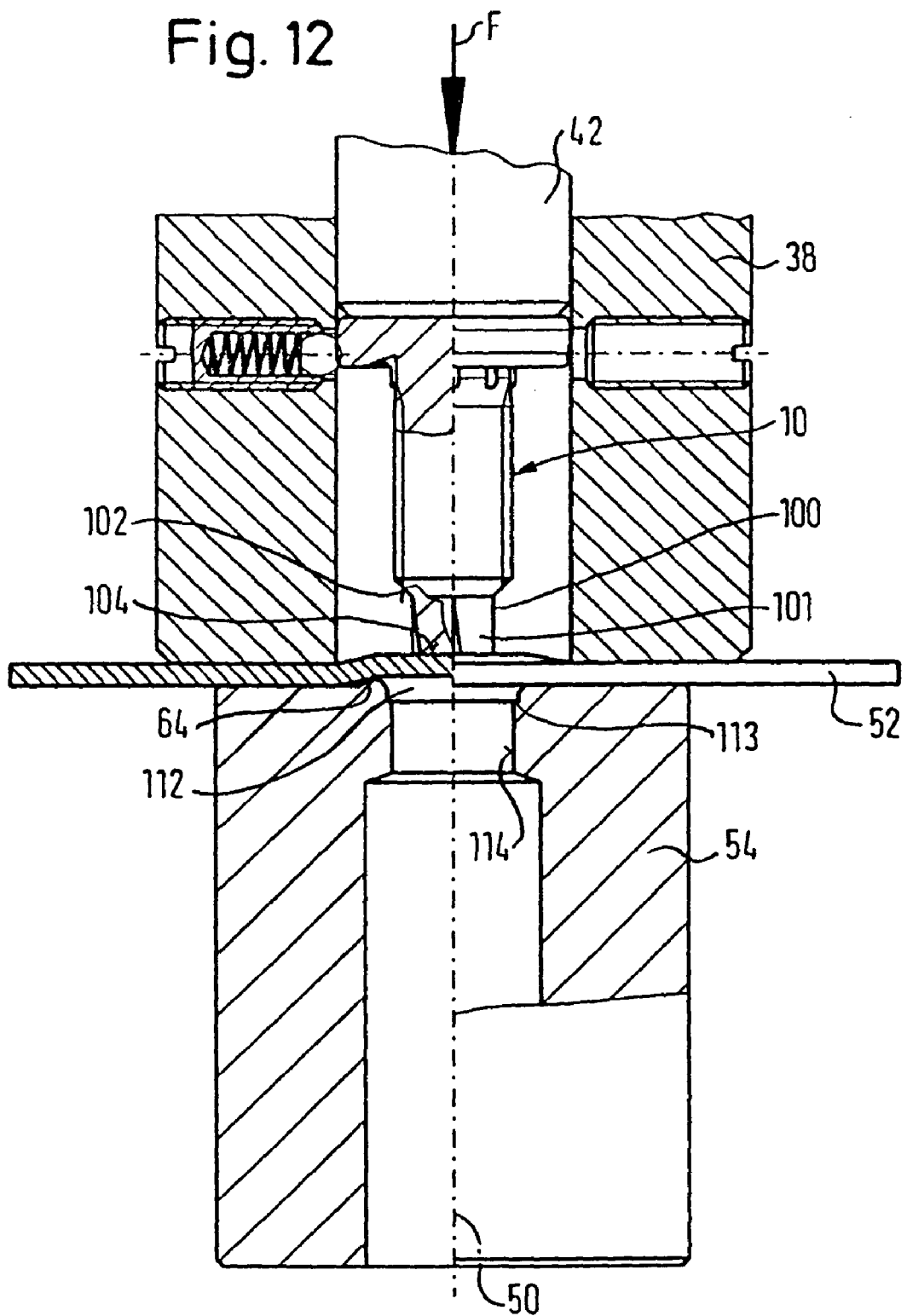

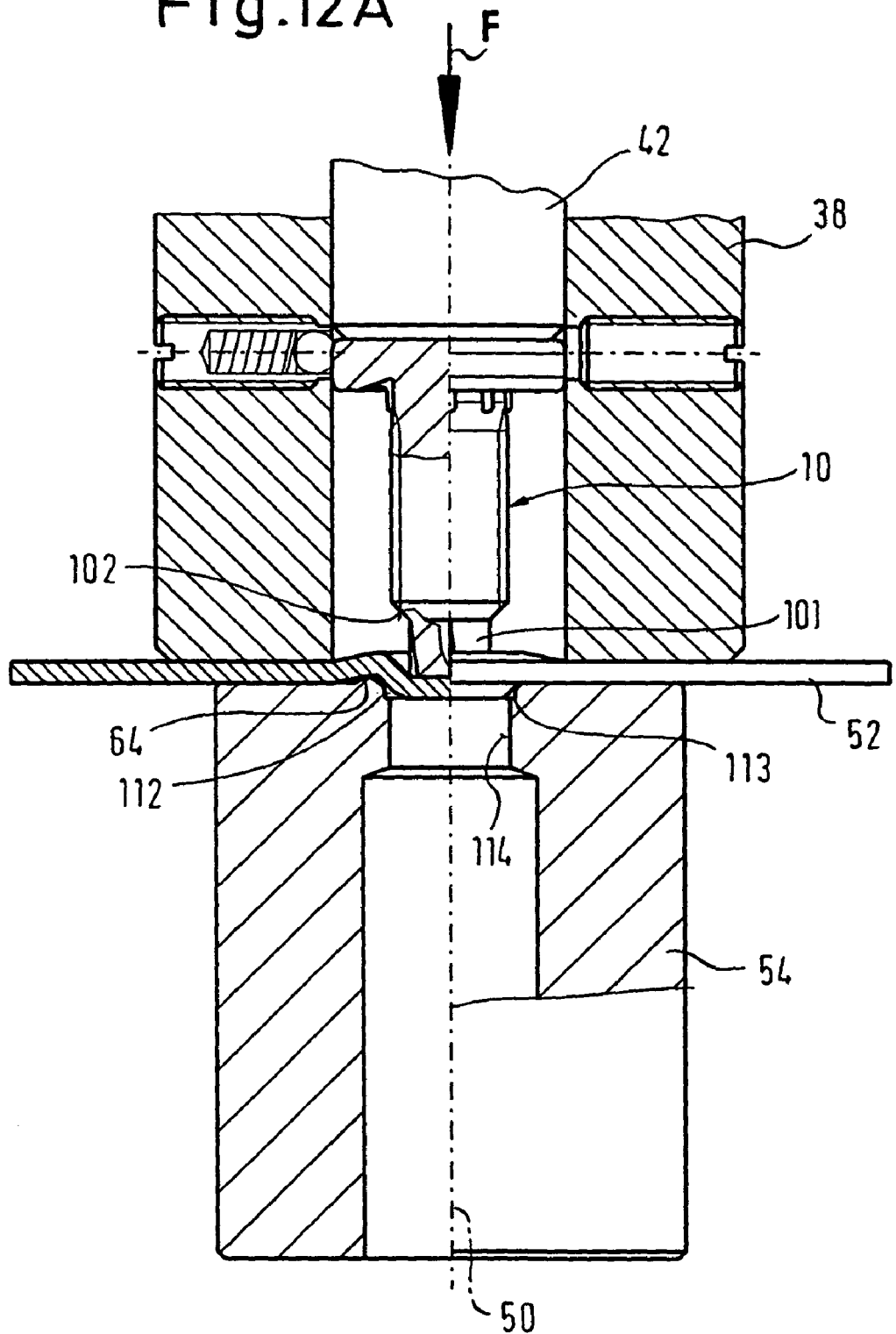

METHOD OF ATTACHING A FASTENER ELEMENT TO A METAL PANEL

The present invention relates to a method of inserting a fastener element, in particular a bolt element, having a head portion and a shaft portion into a sheet metal part or into another plate-like component consisting of deformable material, wherein the bolt element is guided by means of a setting head through the sheet metal part with its end remote from the head portion at the front and is riveted to the sheet metal part in the region of its head portion through the cooperation of the setting head with a die arranged on the side of the sheet metal part remote from the setting head. The invention furthermore relates to a bolt element which can be inserted into a sheet metal part by riveting, to a riveting die for the insertion of the bolt element and to a component assembly comprising a sheet metal part and a bolt element.

Fastener elements of the initially named kind insertable by riveting into a sheet metal part are already known, e.g. from the international application with the publication number WO 94/101688. With such fastener elements the shaft portion of the element, which is formed as a threaded bolt, is introduced from one side into a preformed hole of the sheet metal part and the flange part of the head contacts the sheet metal part at this side. The material of the sheet metal part is subsequently so deformed in a setting process that the material is plastically formed into a very small groove at the shaft portion of the element arranged adjacent to the contact surface of the head portion, with the element being secured in the sheet metal. In this prior art arrangement the sheet metal is preformed prior to insertion of the bolt element so that it has an approximately conically shaped collar or flare with the preformed hole at the narrow portion of the collar. The narrow end of the collar faces towards the head portion of the bolt element and the flare is pressed flat on insertion of the bolt element, which leads to the sheet metal entering into the groove at the shaft portion of the element. A very similar process is shown in German patent 37 04 763. The publication WO 94/101688 also suggests that the collar could be arranged so that it faces in the opposite direction, i.e. with the tip of the bolt entering the flare at the broadest portion and then passing through the preformed hole at the narrow end of the collar. Although this variant is not described in detail, the suggestion is again that the collar be squashed flat on insertion of the bolt element so that it extends practically completely within the plane of the sheet metal.

In the arrangement of WO 94/101688 the head portion of the element has substantially radially extending noses at the contact surface which are pressed into the sheet metal part during the insertion and hereby form a security against rotation. The security against rotation is intended to enable the attachment of a nut to the threaded shaft portion without the element itself turning in the sheet metal part.

Such component assemblies consisting of sheet metal parts and elements are frequently used in industrial manufacturing, for example in the manufacture of motorcars or washing machines in order to secure a further component to the component assembly consisting of the sheet metal part and element or vice versa. It is advantageous that the contact surface of the head portion lies at the other side of the sheet metal part from the further component to be secured to it, so that the sheet metal part is loaded in compression.

The previously known, above described elements of the prior art are, however, not fully satisfactory in practice because of the danger of the element becoming loose during transport or storage prior to attachment of the further component is relatively large, in particular with rivetable bolts which are intended for use with relatively thin sheet metal. The loosening which frequently occurs is so pronounced that the element becomes lost or adopts an orientation which is not acceptable for the further machine processing of the sheet metal part. The loosening of the prior known elements of this kind also leads to the security against rotation that is provided becoming inadequate in some cases, so that the element turns on attachment of the nut before an adequate clamping force can be generated. These difficulties are particularly disadvantageous in bodywork construction and in other areas where the head portions of the elements lie in a hollow cavity and are no longer accessible after the component assembly has been installed. If an element turns under these circumstances, or is lost, then the article to be produced, for example a motorcar, can no longer be manufactured in the context of normal production but must instead be repaired in a complicated manner. Such circumstances should be avoided as far as possible.

A further problem which is particularly pronounced with thin sheet metal lies in the fact that the noses which form the security against rotation must have a certain height, i.e. a height above the contact surface of the head portion in order to achieve the security against rotation at all. With thin sheet metal the material of the sheet metal part is pressed in by the noses to such an extent that the full strength of the sheet metal part is no longer available, which can also lead to difficulties in practice.

It is, moreover, disadvantageous that the fine groove for receiving the plastically deformed sheet metal part during riveting of the element to the sheet metal part is difficult to manufacture and, in addition, makes the bolt unnecessarily expensive. In other respects, this groove also leads to an undesired reduction of the strength of the bolt or of its fatigue characteristics as a result of the sharp edges and the cross sectional reduction of the element which is produced. As a result of the dimensions of the groove an inadequate attachment of the element to the sheet metal part also arises which makes the above mentioned tendency of the element to become loose in the sheet metal part, or indeed to drop out, even worse.

In order to provide assistance here the object was set in an earlier, non prior published German patent application P 44 10 475.8 of the present applicants of providing an element of the initially named kind which can be manufactured and used at favourable cost, with the danger or the element becoming loose or becoming lost from the sheet metal part being substantially reduced and preferably precluded, with both a good security against rotation of the element in the sheet metal part and also a strong connection being possible, and indeed even when one operates with thin sheet metal or with non-iron sheets, for example sheets of aluminium or its alloys. Moreover, a component assembly comprising a sheet metal part and at least one such element as well as a die and a method of riveting the element to the sheet metal part should be made available.

This object is satisfactorily solved by the subject of the earlier application in that the element has concave peripherally closed fields at its lower side serving as a contact surface which are partly bounded by ribs extending outwardly from the shaft portion, with the shaft side ends of the ribs extending in raised form along the shaft portion and merging at the ends remote from the head portion into at least one recess extending spirally around the shaft portion.

Through this design one succeeds, during riveting of the element to the sheet metal part by means of a suitable die arranged concentric to the shaft portion, in plastically deforming the material of the sheet metal part into the concave circumferentially closed fields and also into the said recess without substantial thinning of the sheet metal by the ribs occurring so that the strength of the riveted connection is already substantially increased for this reason in comparison with some previously known elements of the prior art. The fact that the shaft side ends of the ribs extend in raised form along the shaft portion means that the security against rotation is not only achieved by the material driven into the concave fields but rather also by the form locked connection between these shaft side ends of the ribs and the sheet metal part. This leads to the security against rotation being substantially improved in comparison to the security of rotation with elements in accordance with the prior art. The fact that the sheet metal part is not unnecessarily thinned during insertion of the element means it is possible to arrange the recess somewhat further from the lower side of the head than is the case with the groove of the prior art, so that this recess is also easier to realise from a manufacturing point of view. This also leads to a situation in which the shape of the recess can be made cleaner than was previously the case and ensures that the material of the sheet metal flows fully into the recess during the plastic deformation by means of the die and thus generates an increased resistance to loss of the element.

It is particularly advantageous when the shaft portion of the element has a larger diameter in the region of the raised ribs in comparison to the shaft portion remote from the head portion, with the at least one recess being located in this region of larger diameter. As a result of this design the element is less weakened by the recess so that the normal strength of the element can be more easily fully exploited and, on the other hand, the fatigue characteristics of the element can be improved. The security against rotation is also further improved. Particularly important with this design is, however, the fact that the flow behaviour of the material of the sheet metal can be improved during insertion of the element. The pre-finished hole in the sheet metal part must namely have a diameter which enables the shaft portion of the element to be passed through it without the shaft portion being damaged. Through the region of greater diameter the sheet metal is initially driven outwardly during insertion of the element because the region of the larger diameter enlarges the hole and this provides additional material which can be driven into the concave peripherally closed fields and/or into the recess.

The at least one recess which extends spirally around the shaft portion can advantageously be formed by a thread groove, in particular a thread groove which represents a continuation of a thread present on the shaft portion of the element. In this manner the recess is realised with the same procedure which is used for the formation of the thread. This leads to a substantial cost saving during the manufacture of the element and also to a clean formation of the recess. If, in the preferred manner, the ribs are formed so that they extend in raised form along the shaft portion at their shaft side ends prior to the thread rolling process, then these raised rib parts can be straightforwardly deformed during the thread rolling process so that they all finish in the recess. It is, however, on the other hand, entirely conceivable that the raised rib parts are first generated after the thread rolling process in a separate procedure, for example also in a rolling process. In this case the recess could be subdivided into several sections by the raised ribs. The raised parts of the ribs which extend along the shaft portion should, however, not be too long because otherwise they could impair a clean seating of the article to be attached. An exception to this would be if the element is intended for the attachment of an electrical terminal. Here extended rib parts could cause a desired notch effect in the hole of the terminal, which would be useful to achieve a good electrical contact.

The spiral recess can represent one or two thread turns and can also be present in the form of thread sections, above all when the recess is formed as a multi-start thread which would be fundamentally possible and belongs to the invention.

The spiral recess has a great advantage in comparison to a circumferentially continuous groove. If, namely, a nut is removed from the shaft portion after a period of time, then it must be expected that an increased torque will be necessary to remove the nut as a result of contamination or corrosion of the thread part and/or of the nut. An increased torque of this kind would, however, lead to the element being pressed even harder against the sheet metal as a result of the spiral shape of the recess so that an enhanced resistance to turning of the element is present.

The spiral recess could, however, finally be formed with a pitch angle of 0°, i.e. as a circumferentially continuous groove and recesses of this shape also belong to the present invention. They could, for example, be particularly expedient when the element is not used as a threaded bolt but rather, for example, as a bearing spigot. The above mentioned advantages in accordance with which the recess can be formed in accordance with the invention at a larger spacing from the underside of the head portion than is possible in the prior art also apply to the design of the recess as a circumferentially extending groove.

The circumferentially closed field preferably has its greatest depth adjacent to the shaft portion, with this being of advantage for the security against rotation and also for the plastic deformation of the material of the sheet metal part during the insertion of the element.

It is also particularly important that the area contributions of the fields, in comparison to the contact surface of the head portion, can be so selected that they result in an ideal security against rotation and non-critical surface pressure, taking account of the material pairing. This advantage also makes it possible to use the element of the present invention with softer sheet metals, for example with metal sheets of aluminium or aluminium alloys, which will in future find increasing use in motorcar construction. The problem of galvanic corrosion can be handled nowadays by appropriate surface treatment of the elements, i.e. the galvanic corrosion is avoidable, so that elements of iron materials in accordance with the present invention can also be straightforwardly used with, for example, metal sheets of aluminium alloy.

In this earlier proposal it is, however, necessary to generate a hole in the sheet metal part prior to the insertion of the bolt element which is possible by a punch tool or by drilling. The hole is generated in an earlier working step.

A further problem is encountered with known fastener elements of the above described kind in which the tip of the shaft portion is inserted through a hole in the sheet metal and riveting is effected in the region beneath the head.

This further problem is the low resistance to "lever out". That is to say it is relatively easy for a force applied radially to the end of the shaft portion remote from the head portion to lever the element out of engagement with the sheet metal, i.e. so that it becomes loose or is inclined at an undesirable angle relative to the sheet metal.

The object of the present invention is to ensure a riveted connection, particularly in thin sheet metal, i.e. less than 2.25 mm, which is qualitatively better than can be achieved by the prior art even when using the bolt element of the earlier application and simultaneously to at least largely avoid damaging the thread of the bolt element during insertion of the latter.

In particular it is an object of the present invention to provide a method of achieving an improved resistance to "lever out", with the method being applicable both to the elements of the earlier application P 44 10 475 or to other known elements, e.g. elements similar to those described in the publication WO 94/101688.

In addition, it is an object of the present invention to provide a development of the improved method which also avoids the complication of producing the hole in an earlier working step.

It is a further object of the present invention to improve the resistance of a fastener element against lever out and push out forces acting on it, in particular when using thin sheet metal components, and indeed irrespective of whether the sheet metal component is pre-pierced or is pierced by the fastener element.

In order to satisfy these objects there is provided a method of joining a bolt or fastener element, having a head portion, a shaft portion and at least one radial groove or one or more thread turns on its shaft portion, to a sheet metal component by preforming a hole in said sheet metal component or by punching a hole in said sheet metal component using the tip of the shaft portion of said fastener element remote from said head portion, characterised in that the pre-forming or punching of said hole is effected in such a way that a collar of material is formed at the side of the sheet metal component remote from the head portion of said fastener element, and in that the material of said collar is subsequently deformed radially inwardly into said radial groove or thread turns.

For the sake of completeness it should be pointed out that the punching of a hole in sheet metal using the tip of a fastener element is known per se from U.S. Pat. No. 2,593,506. Here the tip of the threaded end of a stud is pushed through a piece of sheet metal supplied on a die and the non-threaded end of the stud is riveted over or headed to complete the installation. The die is arranged so that the stud pierces a simple circular aperture in the sheet metal without a flare or collar. In addition, the resistance to push out and to twist out is poor since these resistances are essentially only achieved by friction between the shaft of the stud and the sheet metal panel. Moreover, there is a substantial danger that the thread will be damaged, either during movement through the punched hole or by compression during the heading operation.

In one aspect of the method of the invention the sheet metal part is pierced by the end of the shaft portion remote from the head under the action of the setting head, optionally in cooperation with the die, with a slug preferably being formed during penetration of the sheet metal part, and with the pierced hole being dilated into a collar surrounding the hole at the die side of the sheet metal part.

It has namely been found, in surprising manner, that it is possible using this technique to pierce a sheet metal part with the end face of the shaft portion of a customary bolt element and to insert the thread of the bolt element through the so formed pierced hole without the thread being damaged to a considerable degree. The formation of the collar namely makes it easier for the threaded portion to dilate the opening and pass through the collar without damaging the threads as will be later explained in more detail.

During the subsequent riveting of the sheet metal part to the bolt element by means of the die the collar material is exploited in order to generate a particular high quality connection between the sheet metal part and the bolt element.

It is particularly favourable when at least one and preferably a plurality and in particular a non-even number of notches or at least substantially radially directed cuts or tears are generated in the rim of the aperture, or at the end of the collar adjacent the aperture. On pushing the thread through the collar these cuts tear further and considerably reduce the force which is required to push the threaded part through, whereby the danger of damaging the thread is also substantially reduced.

Particularly surprising is the finding that the method can be particularly favourably carried out when the end of the bolt element has a so-called Ka shape in accordance with DIN 78. This Ka shape signifies a spigot-like projection at the end of the shaft portion remote from the head portion with a diameter which is somewhat smaller than the core diameter of the thread. The spigot-like projection merges via a divergent conical section into the thread cylinder. The end face of the spigot extends at least substantially perpendicular to the central longitudinal axis of the bolt element.

The installation of such a bolt using the tip pierce method of the present invention can be improved if a plurality of grooves are provided in the jacket surface of the spigot like-projection. In accordance with the invention it has been surprisingly found that such grooves are particularly favourable for the piercing of a metal sheet by means of a bolt element.

The bolt element itself is characterised in that the shaft portion is formed at its end remote from the head portion for the piercing of the sheet metal part. Particularly advantageous forms of the bolt element embrace the formation of the head portion of the bolt element which is to be riveted to the sheet metal part.

A riveting die for use with the bolt element relates to the component assembly which arises after connection of a bolt element to a sheet metal part.

Figure 7:
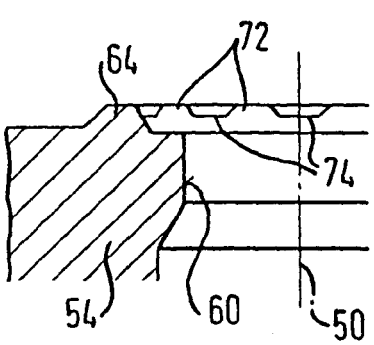
Figure 6:
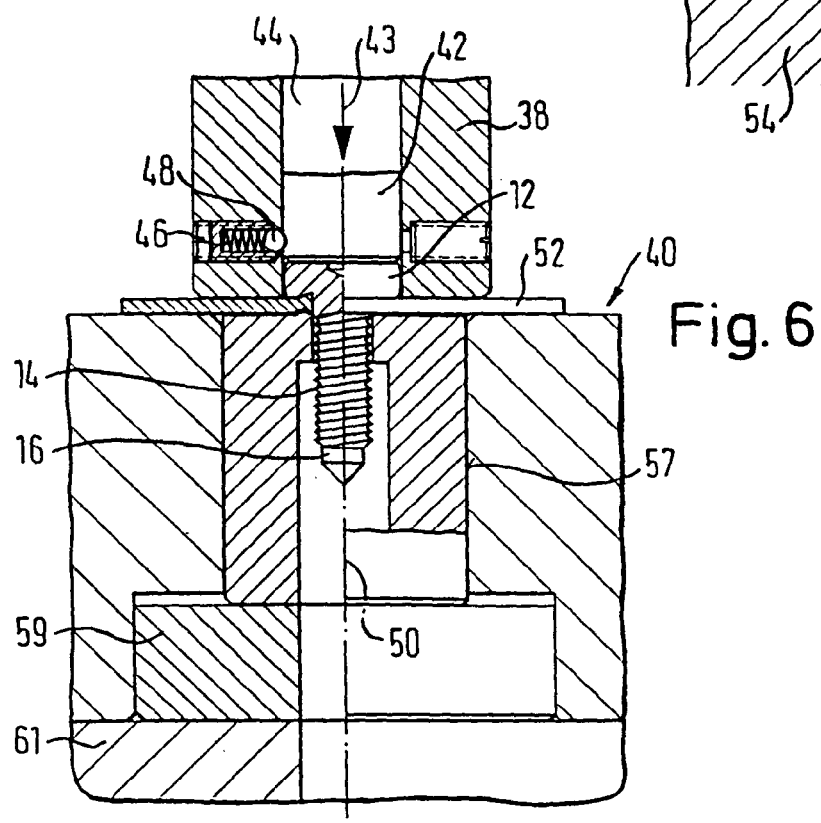
Figure 8:
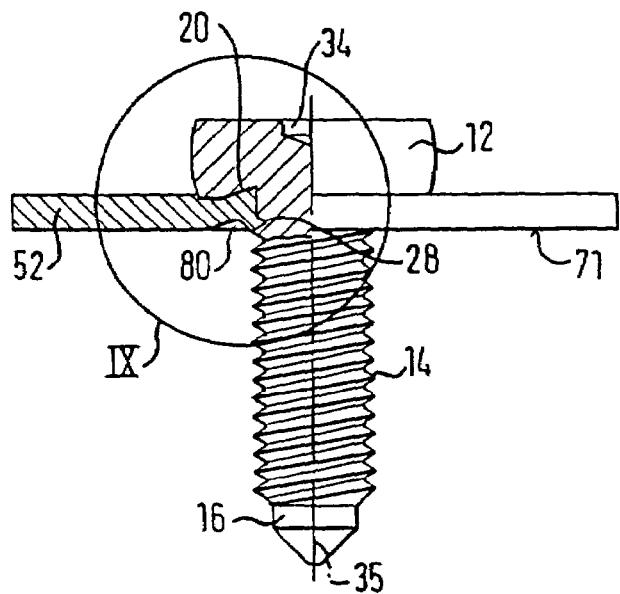
Figure 9:
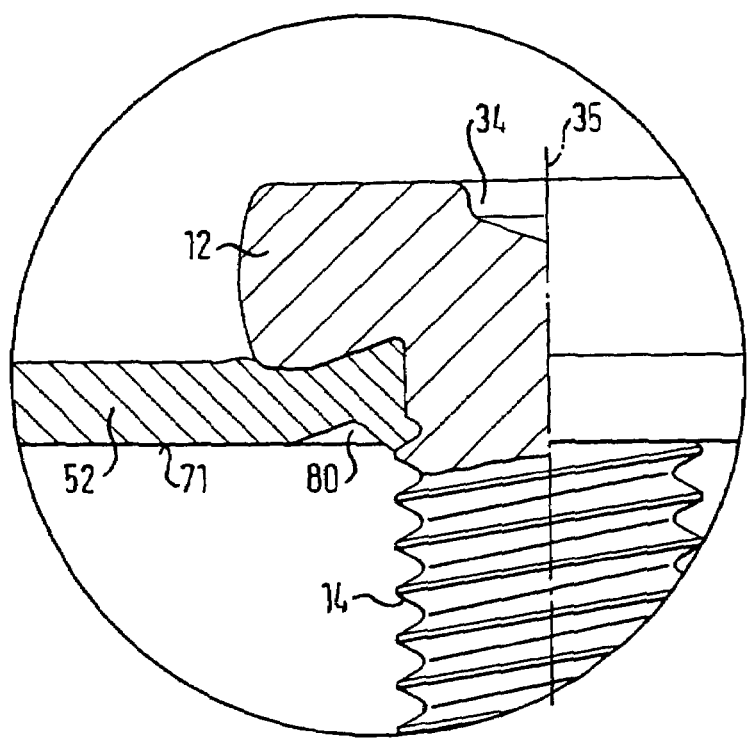
Figure 10:
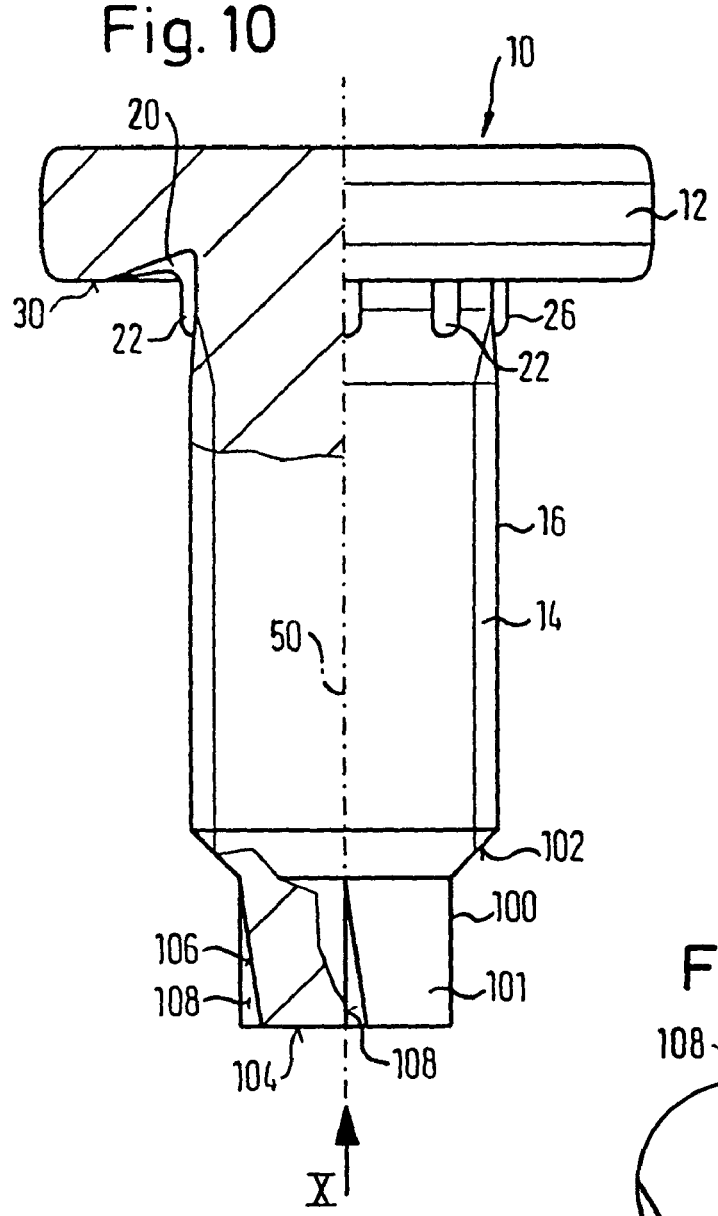
Figure 10A:
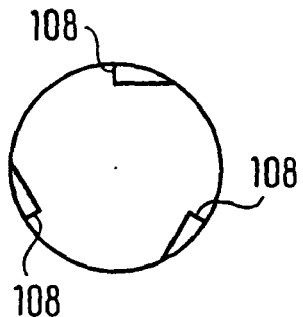
Figure 11:
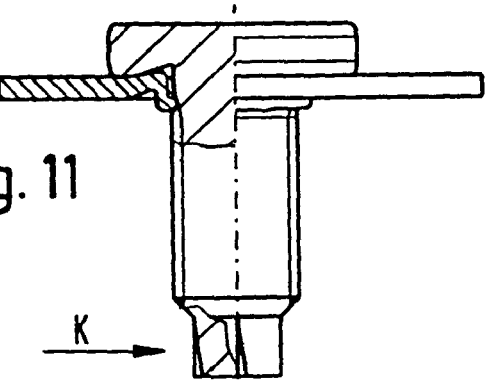
Figure 13:
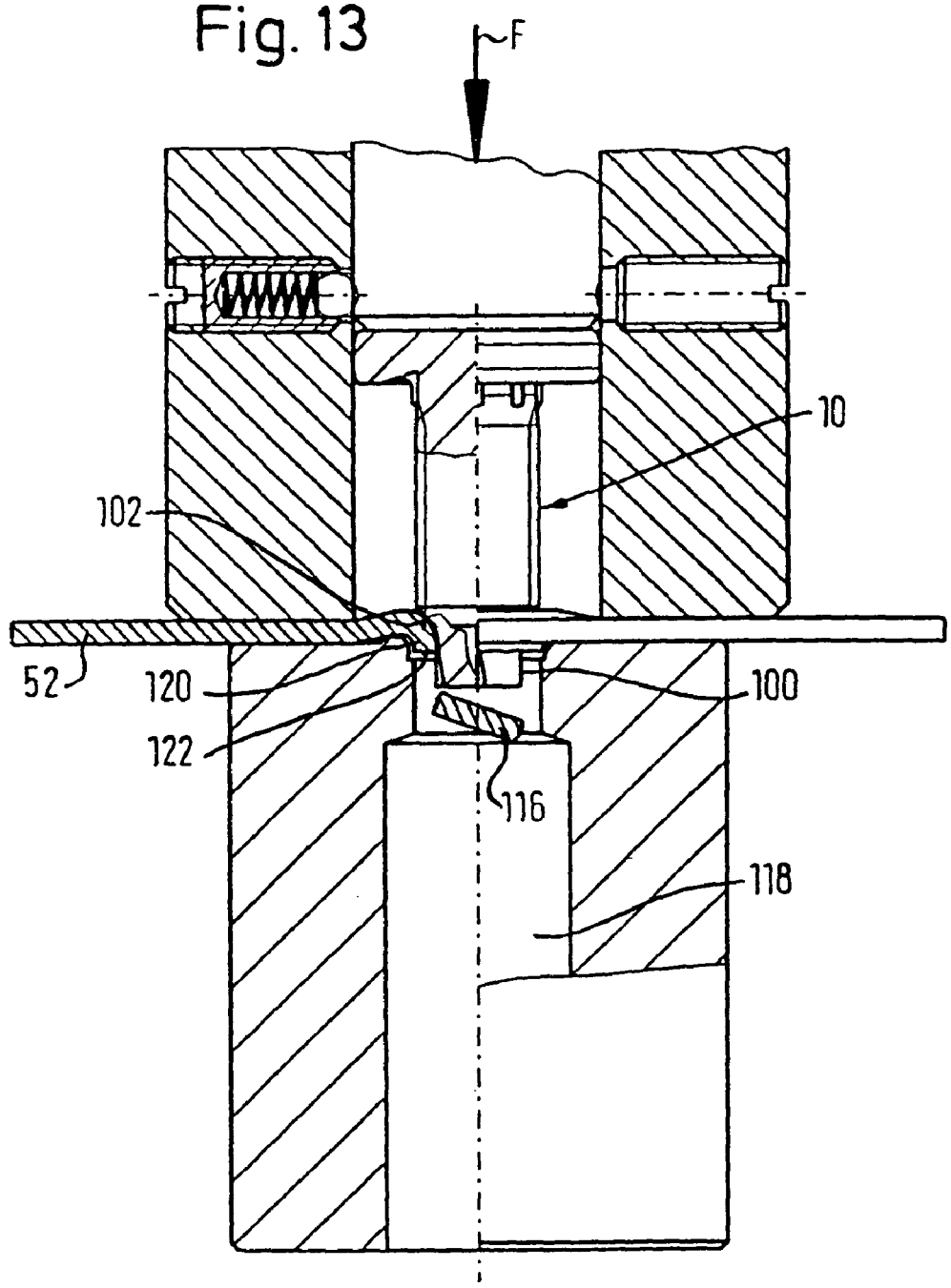
Figure 13A:
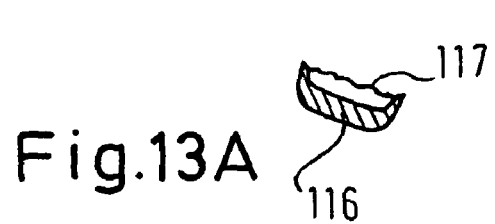
Figure 14:
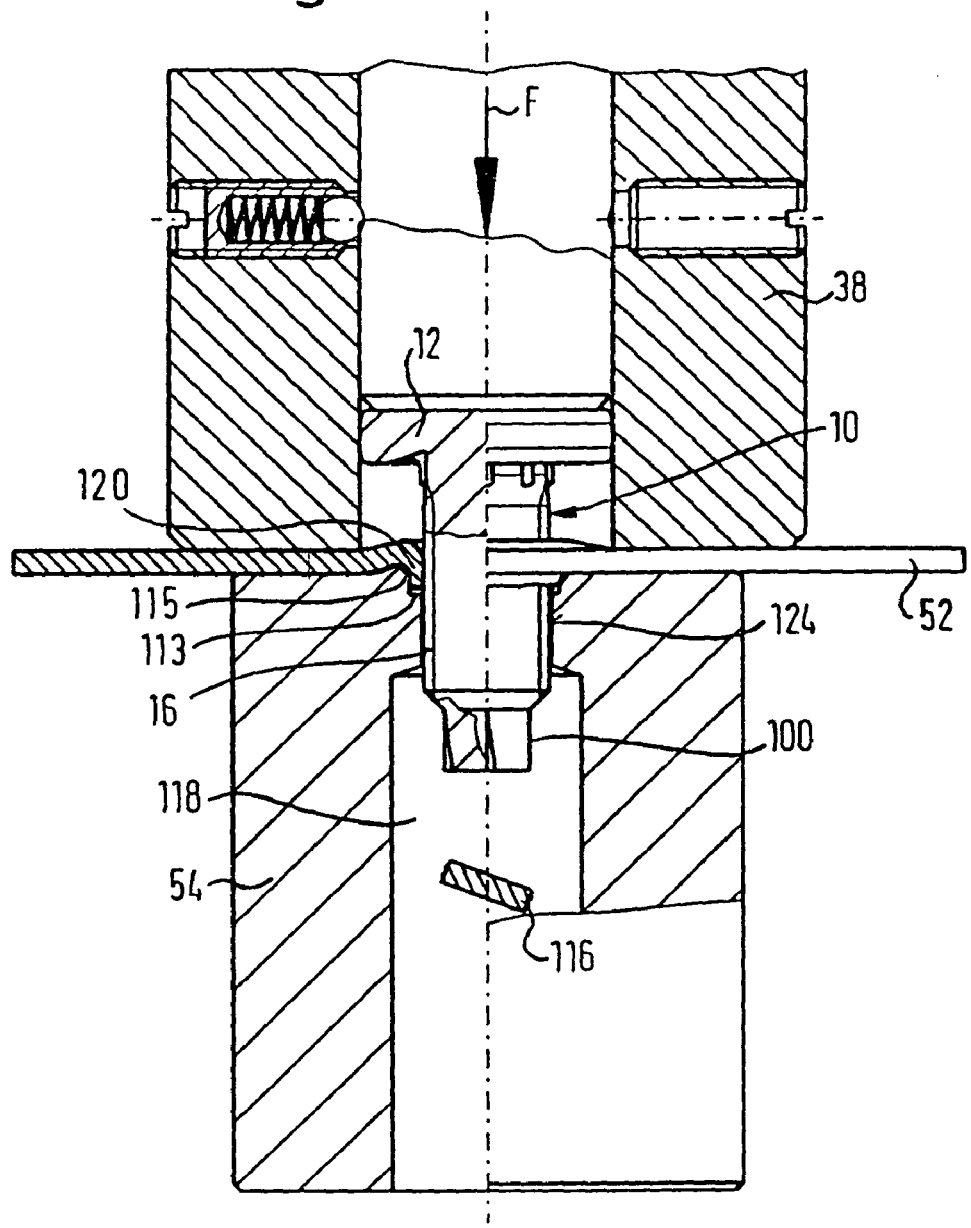
Figure 15:
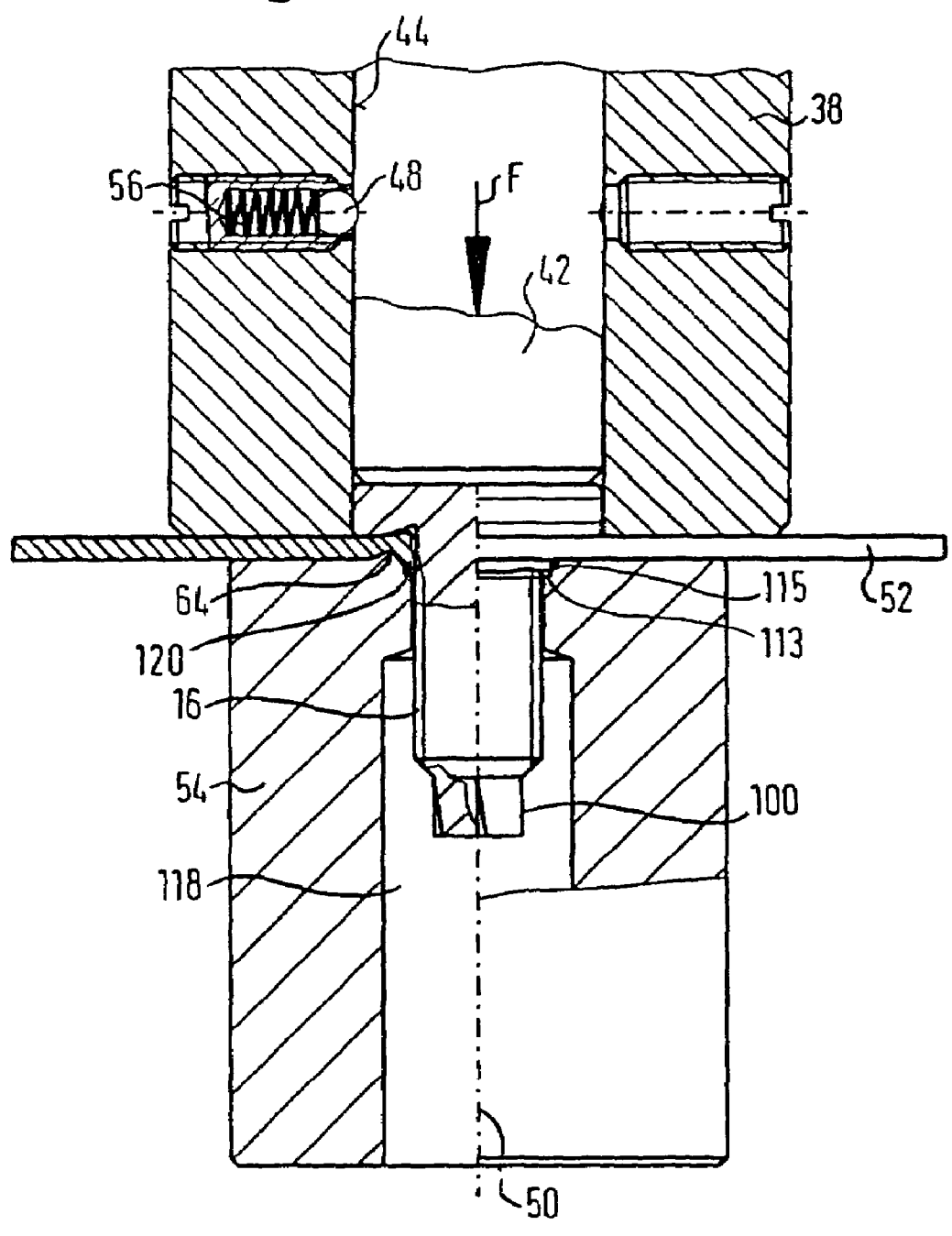

The invention will be explained in more detail in the following with reference to embodiments and to the drawings in which the FIGS. 1 to 9 represent the corresponding Figures from the earlier application P 44 10 475.8 and FIGS. 10 to 25 show the particular design and method of the present application. In the drawings there are shown:

FIG. 1 a side view of a partly longitudinally sectioned element in accordance with the invention which is provided for riveting to a sheet metal part, FIG. 2 an end view of the element in the direction of the arrow II of FIG. 1, FIG. 3 an enlarged illustration of the sectioned part of the element of FIG. 1 as shown in the circle III, FIG. 4 a partial cross section of the element of FIG. 1 in accordance with the section plane IV-IV of FIG. 3, FIG. 5 a schematic illustration of the method of insertion of an element in accordance with the invention of FIGS. 1 to 4 into a sheet metal part, FIG. 6 the end stage of the insertion method in accordance with FIG. 5, FIG. 7 a detailed schematic illustration of the left hand side of a particularly preferred riveting die of the invention for use with the method of FIGS. 5 and 6, FIG. 8 a partly sectional schematic illustration of a component assembly in accordance with the invention consisting of a sheet metal part and an element of the invention riveted thereto, i.e. a component assembly which was manufactured using the method of FIGS. 5 and 6, FIG. 9 an enlarged illustration of the region of the component assembly of FIG. 8, indicated with the circle IX, FIG. 10 an illustration of the bolt element of the present invention in side view and partly in longitudinal section, FIG. 10A a view of the end of the bolt element of FIG. 10 seen in the direction of the arrow X, FIG. 11 a representation of the bolt element of FIG. 10 after insertion and riveting to a sheet metal part, FIG. 12 a method of inserting the element of FIG. 10, on first contact of the element with the sheet metal component, FIG. 12A the method of inserting the element of FIG. 10 into a sheet metal component directly prior to piercing of the sheet metal component, FIG. 13 the method of inserting the bolt element of FIG. 10 directly after the piercing of the sheet metal component, but before the passage of the threaded part through the pierced hole, FIG. 13A a schematic cross section showing the typical shape of the slug formed in the method step of FIG. 13, FIG. 14 the method of inserting the bolt element of FIG. 10 after dilation of the pierced hole by the thread but before the riveting of the head portion of the bolt element to the sheet metal component, and FIG. 15 the method of inserting the bolt element of FIG. 10 after the riveting of the head portion to the sheet metal component.

Figure 16:
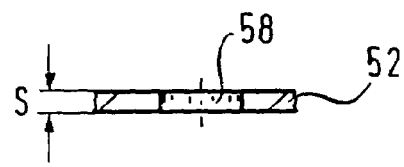
Figure 17:
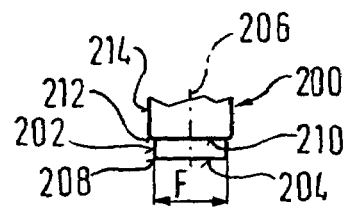
Figure 18:
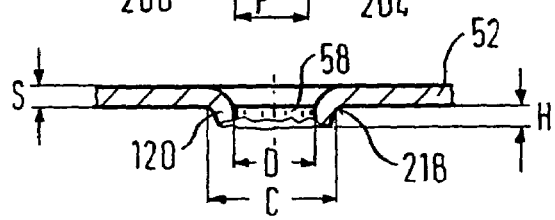
Figure 19:
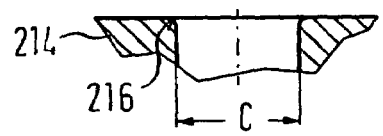
Figure 20:
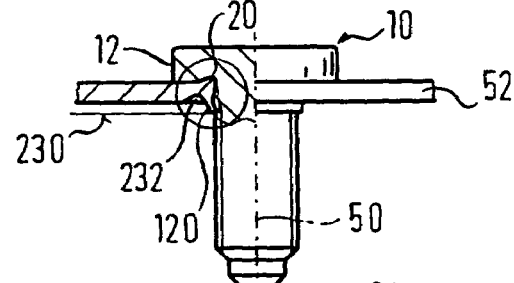
Figure 21:
Figure 21A:
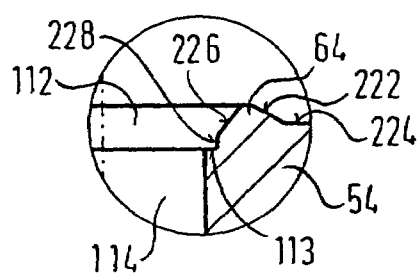

FIG. 16 a schematic illustration of a pre-pierced thick sheet metal component,

FIG. 17 a hole punch for pre-piercing a thick sheet metal component to form a collar for the method of the present invention, FIG. 18 a schematic illustration of a collar formed using the punch of FIG. 17 with the die button of FIG. 19, FIG. 19 a schematic illustration of the die button used with the punch of FIG. 17, FIG. 20 a schematic view of a component assembly of a bolt element with a sheet metal component, the assembly being formed in accordance with the present invention, FIG. 21 a longitudinal axial section through a die button used to form the assembly of FIG. 20, FIG. 21A an enlarged illustration of the profile of the end face of the die button of FIG. 20

Figure 22:
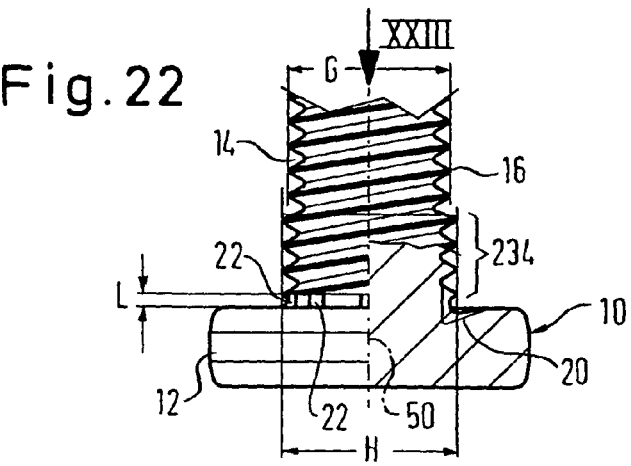
Figure 23:
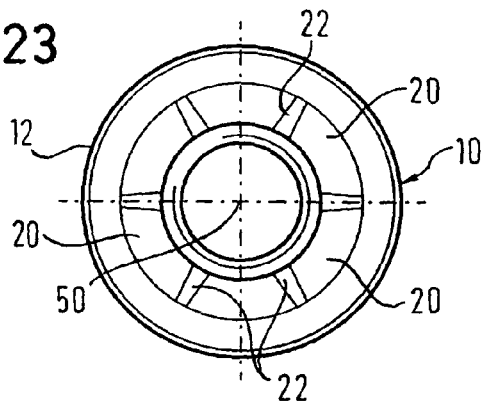
Figure 24:
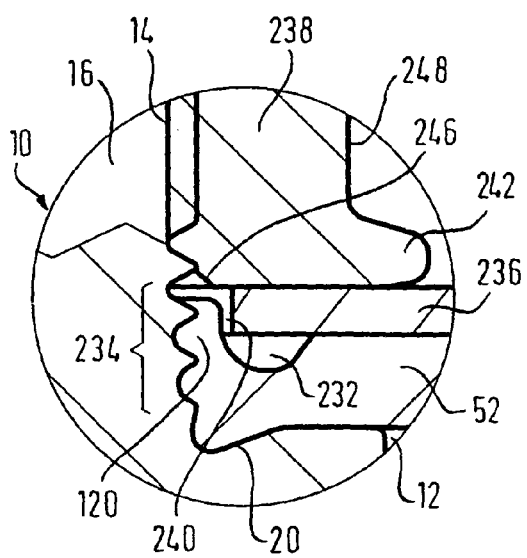
Figure 25:
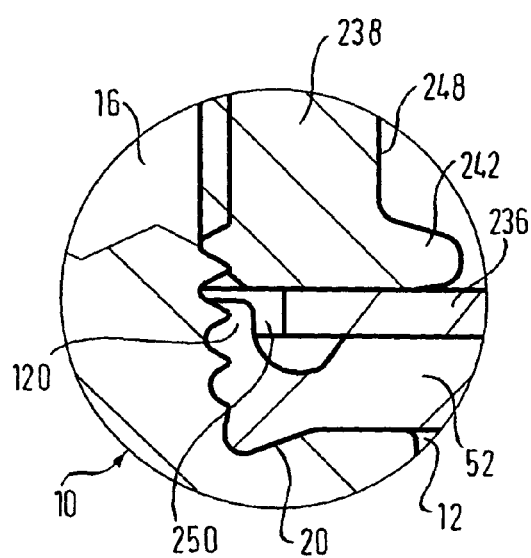

FIG. 22 a schematic partial view of a preferred bolt element for use with the present invention, FIG. 23 an axial view in the direction of the arrow XXIII of FIG. 22, FIG. 24 an enlarged view of a component assembly in the region shown by a circle in FIG. 20 but with an additional sheet metal component secured by a nut, and FIG. 25 a view similar to FIG. 24 but with an eccentric position of the additional sheet metal component.

FIG. 1 shows, initially in side view, an element 10 in accordance with the invention in the form of a threaded bolt having a head portion 12 and a shaft portion 16 provided with a thread 14. As can be seen in particular from FIGS. 2, 3 and 4, the element has concave, peripherally closed fields or pockets 20 at its underside 18 which serves as part of the contact surface. The fields 20 are at least partly bounded by ribs 22 which extend outwardly away from the shaft portion 16, with the shaft side parts 24 of the ribs, which are right-angled in side view, extending in raised form along the shaft portion 16 and merging at the ends 26 remote from the head portion into at least one recess 28. The recess 28 is spirally arranged around the shaft portion and is formed here as a thread groove, i.e. as a continuation of the thread 14 of the shaft portion 16.

The closed fields 20 are bounded at their radially outer side by a circumferentially extending peripheral surface 30 of the head, with the ribs merging at their radially outer ends into this peripheral surface without steps. At their radially inner side the fields 20 are bounded by a cylindrical peripheral surface 32 of the shaft portion.

The surfaces facing the shaft portion of the radially outwardly extending parts of the ribs 22 can also lie, contrary to the graphic illustration in FIG. 3, in the same plane as the peripheral surface 30 or they can, as can be seen from FIG. 3, extend obliquely to the plane 31 defined by the underside 30 of the head portion 12 and be set back from this plane so that they do not project beyond the shaft side of this plane. The peripheral surface 30 and also the shaft side surfaces of the radially extending regions of the ribs 22 form the actual contact surface of the head portion 12.

The closed fields 20 are at least substantially square in this embodiment when seen in plan view and this is in practice a relatively favourable shape for the fields 20. Other shapes of the enclosed fields 20, i.e. fields 20 which are bounded at all sides, are also entirely conceivable in the context of the present invention. The rib parts 22 which are located in the contact region 18 of the head portion 12 and which preferably extend in the radial direction become broader in the radially outward direction with the special design of FIGS. 2 and 4. They merge steplessly without interruption into the peripheral surface 30 of the head portion. In the present example eight ribs 22 are present, with the number of ribs preferably lying between six and eight.

It is evident from FIGS. 1 and 3 that the peripherally closed fields 20 have their greatest depth (measured in the axial direction 35 of the element 10) adjacent to the shaft portion 16. Although the peripheral surface 30 on the shaft side surfaces of the ribs 22 principally belongs to the contact surface, the base surfaces of these closed fields can also be exploited as a contact surface by intentional deformation of the corresponding sheet metal component into the closed fields. In any event, it is possible, with the element of the invention, to provide a contact surface of large area so that the element can also be used with soft sheet metal components without having to fear that a critical surface pressure results. It is particularly favourable when the base surfaces of the closed fields lie at least substantially on a conical surface with an enclosed angle of 130 to 140°, preferably 140°. This cone angle is indicated with the reference $\alpha$ in FIG. 3.

Furthermore, it can be seen from FIGS. 1 and 3 that the element has a centring recess 34 which ensures a high-quality guidance of the element during insertion of the same. The element has, moreover, a conical insertion tip 36. This tip is not only of use when attaching the article which is later to be secured to the element but rather also during the guidance of the element in the setting head during the insertion into the corresponding sheet metal component.

The insertion method is schematically illustrated in FIGS. 5 and 6.

FIG. 5 shows a setting head 38 of a joining tool 40 comprising a pressing and joining plunger 42 which is moveable in the direction of the arrow 43.

With reference to FIG. 5 the arrow 43 shows the supply direction of the element 10 in the setting head. The elements 10 are fed individually to the setting head 38. The element shown in FIG. 5 passes under gravity, optionally also under the action of compressed air or of the pressing and joining plunger 42, through the bore 44 of the setting head until the head portion 12 of the element which is partly spherically rounded for guidance purposes enters into contact with a ball 48 biased by means of a spring 46. In practice three such spring biased balls are preferably provided, which are arranged at intervals of 120° around the longitudinal axis 50 of the setting head 38. At the stage shown in FIG. 5 the pre-apertured sheet metal component 52 into which the element 10 is to be inserted is already held between the setting head 38 and the riveting die 54 of a lower tool 56. The shaft portion 16 of the element which is provided with a thread 14 has already partly passed through the pre-manufactured hole 58 in the sheet metal component 52 and through a cylinder-like centring opening 60 of the riveting die 54 which is coaxially aligned therewith. The riveting die or die button 54 itself is interchangeably supported within a bore 57 of the lower tool 56 belonging to the joining tool and is supported via a plate 59 on a lower press plate 61.

In the later stage of the insertion method the pressing and joining plunger 62 provided in the setting head moves further downwardly and presses the head portion 12 of the element past the three spring loaded balls 48. During this movement the crown region 64 of the riveting die 54 arranged coaxially to the hole 58 and to the axis 50 is pressed into the material of the sheet metal component and this leads to the material of the sheet metal component flowing on the one hand into the closed fields 20 and on the other hand into the recess 28 and thus producing a reliable riveted connection between the element 10 and the sheet metal component 52, which then jointly form a component assembly.

It is particularly favourable when the riveting die 54 has the shape in the crown region which can be seen from FIG. 7. I.e. this crown region of the riveting die has a ring-like, wave-shaped end face which has crests 72 and valleys 74 extending in the axial direction to generate the plastic deformation of the sheet metal material. When using this riveting die the raised crests 72 serve to drive the material of the sheet metal into the concave fields 20 in the underside of the head portion 12 of the element 10. The valleys 74 come into contact against the sheet metal component in regions where the radially outwardly extending parts of the ribs 22 lie, so that a pronounced thinning of the sheet metal material does not arise in the region of the ribs in accordance with the invention.

As a result of the clamping of the sheet metal material between the riveting die and the lower side of the head portion 12 of the element 10 the sheet metal material is also forced to flow into the recess 28 so that the desired form-locked connection arises. A special measure for the angular alignment of the element 10 relative to the crests and valleys of the riveting die is in practice not necessary because, for energetic reasons, the element 10 attempts to turn in such a way that the potential energy is a minimum and thus adopts a position in which the crests 72 of the riveting die 54 are aligned with the concave fields 20, i.e. the requisite alignment takes place via a slight automatic turning of the element during the setting procedure.

As a result of the design of the riveting die a groove extending at least substantially coaxial to the longitudinal axis 35 of the element 10, and which may be an interrupted groove, is formed, as shown in FIGS. 8 and 9, at the side remote from the head 12 of the element 10, as can best be seen from FIG. 9. This groove has a wave-shaped base surface, above all when the riveting die has the shape of FIG. 7. The crests of the wave-shaped base surface should, however, not project beyond the lower side 7 of the sheet metal component in order to ensure a clean seat for the article which is to be secured to the sheet metal component. An exception to this exists, however, when the article is an electrical terminal. In this case the crest regions of the wave-shaped base surface can project beyond the lower side of the sheet metal component in order to ensure a higher surface pressure at the terminal, i.e. a better electrical contact.

The element of the invention can, however, also be differently formed than as a threaded bolt. For example, an element 10 in the form of a bearing spigot could be considered. I.e. the thread is replaced or supplemented by a cylindrical bearing surface. Alternatively, the fastener element could be a nut element with the shaft portion being hollow.

The so described features of the head and the riveting of the head portion with the sheet metal component also apply without restriction to the bolt element which will now be explained in more detail with reference to the following FIGS. 10 to 15. For this reason elements of the drawings of FIGS. 10 to 15, which are also to be found in the FIGS. 1 to 9, will be provided with the same reference numerals and an additional description of the parts or functions characterised with the same reference numerals can be largely dispensed with, because the previous description also applies to the FIGS. 10 to 15. Only the differences will be described in detail. In principle there are three main differences. These are the following differences:

a) the design of the end 100 of the bolt element 10 remote from the head portion 12,
b) the punching through of the sheet metal component by means of its end 100,
c) the formation of a collar around the punched hole which is achieved by a somewhat modified shape of the die.

It is evident from FIG. 10 that the end 100 of the bolt element 10 remote from the head portion 12 has a so-called Ka shape in accordance with DIN 78. I.e. the end 100 represents a spigot-like projection 101 with an outer diameter which is somewhat smaller than the core diameter of the thread 14 and merges via a truncated, cone-shaped section 102 into the thread 14, with the cone angle of the truncated, cone-shaped section which diverges in the direction of the thread 14 amounting to 90°.

In distinction to the standard Ka-shape of DIN 78, a plurality of wedge-shaped grooves 106 arranged parallel to the longitudinal axis are located at the periphery of the spigot-like projection 101 with the depth of the grooves (measured in the radial direction) reducing continuously from the end face 104 of the shaft portion 16 and going to zero at the start of the conical section 102.

The basic Ka-shape of the end of a bolt element is admittedly known per se; it is, however, normally used for a quite different purpose, namely to enable the attachment of a nut, using automatic screwing devices in particular. The wedge-shaped grooves are a special feature of the present design and should not be confused with the longitudinal grooves sometimes provided in the lower part of the thread cylinder of a bolt for paint stripping purposes. The number of the wedge-shaped grooves is not so critical for the present invention. It is, however, particularly advantageous if a non-even number of such grooves 106, for example 3 or 5 such grooves, is/are provided.

Each groove is of V-shaped cross section, e.g. of a 90° inclined angle, with the one side surface of the groove, for example the side surface 108 in FIG. 10, lying in a radial plane, while the other surface forms an angle with the radial surface 108. The base of the V-shaped grooves preferably subtends an inclined angle of about 10° to the longitudinal axis.

In plan view, i.e. as seen above the longitudinal axis 50 of FIG. 10, the grooves appear fairly narrow as a result of their shadow depth. It should be noted that the grooves or other notching features are not essential with normal strength sheet metal when a Ka-shape alone will suffice. The grooves or other notching features are, however, of advantage with high strength sheet metal, which is increasingly being used in motorcar production. The end face of the spigot is preferably flat and perpendicular to the axis of the element; it could, however, be slightly convex or slightly concave, with the convex shape being preferable to the concave shape.

Although the design of FIG. 10 represents a preferred embodiment, other embodiments can also be considered. For example, the grooves 106 in accordance with FIG. 10 could be formed as ribs. These ribs should lie within a circle coaxial to the longitudinal axis 50 of the bolt element, with the diameter of the circle being smaller than the core diameter of the thread 14.

The end face 104 can also be slightly concave or convex and could also be formed as a point, e.g. an ASP point in accordance with DIN 78. The pointed shape is, however, not particularly preferred because problems arise if the bolt element is not guided absolutely perpendicular to the sheet metal component. If only a slight tilting of the bolt element arises in the setting head, for example when the latter is somewhat worn, then an end of the bolt element formed as a point would be pressed into the sheet metal component. A correction of the inclined position of the bolt element would then no longer be possible, i.e. the use of a bolt element with a pointed end is only restrictively capable of satisfying the demands of the installation process.

The sequence of events in the installation of a bolt element 10 in a sheet metal component will now be explained in more detail with reference to FIGS. 12 to 15, with the FIG. 11 showing the finished component assembly comprising the bolt element 10 and the sheet metal component 52.

FIG. 12 shows the bolt element 10 in the setting head 38 and indeed during a working stroke of a non illustrated press in which the setting head 38 and the riveting die 54 are provided. The setting head 38 is namely secured to an upper tool (not shown) or to an intermediate plate (not shown) of the press and has been driven downwardly to the extent that the sheet metal component 52 is clamped between the end face of the setting head 38 and the oppositely disposed end face of the die 54. One sees that the ring-shaped raised portion 64 at the end face of the die 54, which can be formed in accordance with FIG. 7, has caused a slight upwardly directed bulge of the sheet metal component 52. During the further closing of the press during the working stroke the plunger 52 is moved further downwardly while the part of the setting head indicated in hatched lines deflects resiliently rearwardly relative to the upper tool of the press or of the intermediate plate of the latter. In FIG. 12 the plunger 42 has moved downwardly to the extent that the end face 104 of the bolt element just contacts the sheet metal component 52. From FIG. 12 one can clearly see that the outer diameter of the spigot-like end 101 of the bolt element is substantially smaller than the inner diameter of the tapered ring recess 112 at the end face of the die.

That is to say that the spigot-like projection 101 at the end 100 of the bolt element which acts as a cutting projection contacts the sheet metal component 52 which lies between the cutting projection and the die 54 lying beneath it, which is aligned coaxial to the central longitudinal axis 50 of the bolt element.

The tapered ring recess 112 of the die merges via a ring shoulder in the form of a flat shoulder 113 into a section 114 with a diameter which is smaller than the smallest inner diameter of the tapered ring-shaped recess 112, but is, however, ca. 0.1 mm larger than the outer thread diameter of the bolt element 10. The precise shape of the tapered ring-shaped recess 112 is shown later in FIGS. 21 and 21A. The transition from the tapered recess to the flat shoulder can be rounded. In addition, with the tip pierce version of the die button 54 in particular (but not exclusively), the transition from the ring shoulder 113 into the bore 114 can also be formed as a rounded shoulder rather than as a right angle. Amongst other things, this can assist in the guidance of the bolt element 10.

The die 54 is held and secured in known manner in a stamping/shaping tool or in a press.

In FIG. 12A the setting plunger has moved further downwardly and the tip of the bolt element has depressed the sheet metal into the tapered recess 112 of the die button 54. The stress in the sheet metal has increased to a value which is only fractionally below the stress necessary for piercing of the sheet metal 52. A collar 120 has been at least partly preformed at this stage. Only a slight further downward movement of the plunger 52 is required to reach the situation in FIG. 13 in which the bolt element has cut a slug 116 from the sheet metal component 52 under the influence of the force F resulting from the stroke movement of an upper tool of the press. The panel is initially formed into a cone shape in the region beneath the fastener element in the phase in which the slug is cut from the panel. Thereafter the cone shape is drawn and/or dilated as the conical portion 102 of the fastener (FIG. 10) is driven through the cone-shaped panel portion and has thereby generated a tubular deformation, i.e. a collar or flare, 120 in the shaped sheet metal component 52, with the tubular deformation being directed in the direction of the free space 118 of the die. One notes from the enlarged drawing of FIG. 13A that the side edges 117 of the slug 116 are rough, and this also applies to the downwardly directed end face of the ring-like collar 120, i.e. of the tubular portion. Moreover, the slug 116 is slightly dished as a result of it being stamped from an unsupported portion of the sheet metal component.

What one does not, however, see in the drawing is that the wedge-shaped grooves have generated notches, cuts or tears in the sheet metal component which are particularly advantageous because they tear further under the action of the truncated, cone-shaped section 102 and reduce the forces which are necessary for the deformation of the sheet metal component in the area of the collar.

The force which is necessary in order to push the bolt element through the collar is correspondingly also reduced and this also applies to the further stage of the insertion method of FIG. 14, where the collar has been further dilated by the threaded part. In this manner the force acting on the thread has been reduced so that damage to the thread need not be feared.

In accordance with the drawing of FIG. 14 the bolt element has moved, as a consequence of the downwardly directed movement of the upper tool (riveting plunger 42), which causes a corresponding movement of the plunger 42, into the bore 124 of the die which forms a guide. In doing so it has further broadened the tubular section of FIG. 13 and has largely moulded it in a form fitted manner into the ring recess 112 of the die.

This shaping of the sheet metal material takes place essentially by the first two thread turns of the bolt element. These thread turns can be made substantially harder and of higher strength using a known heat treating process than the following thread turns which are associated with a specific strength class, for example 8.8. Damage to these thread turns is avoided by the increased strength. The hardening of the first thread turns of a bolt element is known per se in the art, and above all for self-tapping bolts. This increased strength can also be achieved with means known per se.

The punched slug 116 drops in the drawing of FIG. 14 through the free space 118 of the die 54 and can be disposed of in known manner.

In the stage shown in FIG. 15 the tool of the press is moving through the lower dead centre. As a result of the cooperation of the die 54 and the underhead shape of the bolt element 10, a form fitted locking of the sheet metal material and the head portion 12 of the bolt element 10 takes place, as previously described with reference to the FIGS. 1 to 9, with this riveted or locked connection tending to be of higher strength than for the known component assembly of the earlier German patent application P 44 10 475.8 consisting of a pre-apertured sheet metal component and bolt element. The reason for this is that in the present invention the collar 120 makes material available in the critical region and this material is pressed during the deformation which occurs during closing of the press in a more complete manner into the ring recess and into the closed fields of the bolt element, whereby a higher permanent stress can be achieved in this region, which is favourable for the strength of the connection.

The movement of sheet metal material radially into the turns of the thread groove immediately beneath the head portion of the bolt element is facilitated by the tapered shape of the recess 112 at the end face of the die. The axial movement of panel material into the closed fields is promoted by the ring projection 64 at the end face of the die button with the flanks of the ring projection of the die button helping to promote the flow of material into the thread turns defining the recess at the shaft portion 16 of the bolt element 12. The shoulder 113 at the bottom of the tapered recess not only assist the movement of panel material radially and axially but also limits the axial extent of the radially deformed collar so that it cannot interfere with the attachment of a further sheet metal component or of a nut as will be described later with reference to FIGS. 24 and 25.

The component assembly of FIG. 11 results after opening of the press and removal of the sheet metal component with the bolt element riveted to it.

It should be noted that with thin sheet metal, typically of a thickness less than about 2.25 mm, it is advantageous, when using a bolt element of the type proposed in the German patent application P 44 10 475.8 with a pre-pierced sheet metal component, or when using any other fastener in which the sheet metal is to be engaged with a radial groove or with one or more thread turns, to provide resistance against push-out, for the sheet metal component to be provided with a collar on the side remote from the head of the fastener element.

This collar, which can conveniently be formed during the piercing operation, e.g. by a suitably shaped hole punch, (such as one resembling the end of the tip pierce bolt described above), will be the same, or at least approximately the same, in shape as the collar 120 shown in FIGS. 11, 14 and 15 of the present application. During the setting of the further element in the pre-pierced hole provided with the collar, the material of the collar will then be squeezed, in the same way as shown in FIGS. 14 and 15, so that it flows essentially radially into the radial groove or thread turns of the fastener element to generate the resistance to push-out. This design has a further advantage. Because of the length of axial engagement between the collar and the bolt element the connection that is produced between the fastener element and the sheet metal has a very high resistance to forces or force components acting transversely to the longitudinal axis of the fastener element which effectively try to lever the fastener element out of the sheet metal by a type of "unbuttoning" action, i.e. to forces acting for example in the direction K in FIG. 11. The previously known elements have a relatively low resistance to such lever forces. The component assembly of the present invention, i.e. the fastener element and sheet metal assembly, e.g. of FIG. 11, has a substantially higher resistance to such forces. The use of the present invention with a pre-pierced hole will be summarised later with reference to FIGS. 16 to 21A.

It will be noted that the setting of the fastener element is effected in the embodiment of FIGS. 11 to 15 by a die button having a ring nose disposed coaxial to and radially outside of the ring recess 112 of FIG. 12. This ring nose may either have the shape shown in FIG. 7 or may alternatively be a ring nose 64 of constant, approximately roof-shaped cross-section, for example as shown in FIG. 15, and as shown in more detail in FIGS. 21 and 21A.

It will be noted that the cylindrical wall 115 of the ring recess 112 is slightly tapered in the direction away from the head of the fastener element. During closing of the press and setting of the bolt element, i.e. riveting of the fastener element to the sheet metal, this tapering surface helps deform the material of the collar 120 radially inwardly into the radial groove or turns of the thread. This movement of metal is also favoured by the shaping surfaces of the concave fields 20, i.e. by the angle α (FIG. 3). In addition, the radial surface 113 at the base of the ring recess 112 ensures a clean termination to the collar after fitting of the fastener element and ensures that the collar material does not protrude axially to an extent which could lead to an unsatisfactory connection to a further sheet metal component to be bolted to the first. Furthermore, this surface 113 also aids in the radial deformation of the collar material by ensuring that it cannot deviate axially in the direction away from the head of the fastener element.

In addition, the surface 113 helps ensure that the deformed sheet metal material fills out the concave fields 20. When the collar 120 is preformed prior to insertion of the fastener element, it should preferably have an inner diameter equal to or fractionally smaller than the maximum diameter of the fastener element in the region of the radial groove or last thread turns. The provision of such a collar by a pre-piercing operation is also beneficial in facilitating centring of the fastener element during its insertion into the pre-pierced hole.

It should be noted that with thicker sheet metal, i.e. above about 2.25 mm, the die button is shaped in a similar way so that a collar which projects beyond the plane of the sheet metal component away from the head of the fastener element is also created here, in particular when using a die button with a ring nose 64 as described above. Thus good values of lever out resistance can be achieved with both thick and thin sheet metal components.

Furthermore, the outside shape of the collar 120 is slightly conical—both with thin sheet metal and with thick sheet metal and this facilitates the centring of another sheet metal component placed over the shaft end of the fastener element and which is to be clamped against the sheet metal component 52.

Finally, it should be noted that the radially extending portions of the ribs 22 need not fully bound the concave fields 20 but could instead only extend pathway along the radial boundaries of those fields.

The use of a collar to secure a bolt element fixed in a hole in a pre-pierced panel will now be explained in further detail with reference to FIGS. 16 to 21A.

FIG. 16 shows a sheet metal component 52, having a plane cylindrical hole 58 preformed therein. This may, for example, be done by punching or by drilling. It will be noted that the sheet metal has a thickness S which is greater than 2.25 mm. With panel thicknesses greater than 2.25 mm it is namely sufficient to prepare the panel by forming such a simple cylindrical hole 58.

For panels having a thickness equal to or less than 2.25 mm the panel is prepared so that it has an aperture 58 with a ring collar or flare 120 which is formed by a hole punch 200, having the shape shown in FIG. 17. It will be noted that the hole punch 200 has a cylindrical spigot 202 at its front end, with the cylindrical spigot 202 having a planar end face 204 perpendicular to the central longitudinal axis 206 of the hole punch. The circular edge 208 formed at the intersection of the front end face 204 with the cylindrical wall of the spigot 202 is a cutting edge. Behind the cylindrical spigot 202 there is a shoulder 210 with a rounded edge 212 forming a transition to a cylindrical portion 214 of the hole punch with a larger diameter.

The punching of the hole 58 is effected using a die button 214, the end face of which confronting the hole punch is shown in a longitudinal section in FIG. 19. It will be noted that the die button has a cylindrical central bore having a diameter C which merges at the front end face of the die button 214 via a radius 216 into the flat end face of the die button. The corresponding dimension C is also entered into FIG. 18 and it can be seen that this corresponds to the maximum outer diameter of the generally conical collar 120 and that the radiussed shoulder 216 has formed a corresponding radius 218 at the point where the collar blends into the plane of the sheet metal component 52.

It will also be noted that the diameter D of the aperture 58 is just fractionally greater than the diameter of the cylindrical portion 214 of the hole punch 200.

The action of the hole punch 200 and its cooperation with the die button 214 is closely similar to the situation which occurs with the tip piercing method illustrated and described with reference to FIGS. 12 to 15.

The initial punching is carried out by the cylindrical spigot 202 with the sheet metal panel being supported on the die button 214 at a diameter substantially greater than the diameter F of the cylindrical spigot 202 of the hole punch 200. This again leads to the panel material being depressed before the slug (not shown) is punched out from it, as shown in FIG. 12A. Thereafter the shoulder 208 with the radius 212 completes the shaping of the flare or aperture in the sheet metal component, leading to a shape as shown in FIG. 18. It will be noted that the height H and the edge shape of the collar are not specifically defined, they simply arise naturally through the cooperation of the hole punch with the die button. This means that the end of the collar is slightly uneven, as shown in FIG. 18.

The height H of the collar is typically a minimum of 1.5 mm irrespective of the precise thickness S of the sheet metal component 52. The diameter D is made just fractionally larger than the nominal outside thread diameter of the bolt element used, e.g. D is made about 0.1 mm greater than the nominal bolt diameter.

FIG. 20 then shows a sketch illustrating the component assembly after a bolt element 10 of the preferred type, which will subsequently be discussed with reference to FIGS. 22 and 23, has been pressed into the sheet metal component 52 using a setting head such as 38 in FIG. 12 in cooperation with a die button 54, which is shown in more detail in FIG. 21. The precise shape of the end face of the die button 54 is shown to an enlarged scale in FIG. 21A, which actually shows in a circle the portion of the die button 54 circled in FIG. 21.

It will be noted from FIGS. 21 and 21A that the die button has a ring nose 64, having a generally roof-like shape with sloping flanks, with the outer flank 222 merging into the planar end face 224 of the die button, and with the inclined inner flank 226 merging into a cylindrical recess 228 within the central bore 114 of the die button. The sloping flank 226 results in a tapered recess 112 as previously described with reference to FIGS. 12 to 15. It can be seen that the cylindrical recess 228 has a flat shoulder 113 at its bottom, which in use contacts the end of the collar 120 of FIG. 18 and determines the maximum axial projection of the collar once the bolt element 10 has been fitted.

It can be seen from the circled portion of the component assembly of FIG. 20 (which surrounds part of a longitudinal axial section through the assembly) that the collar 120 terminates at a level 230 which is defined by the flat shoulder 113 in FIG. 21A. This level 230 stands proud of the sheet metal component 52 by a significant amount due to the engagement of the collar 120 over a substantial portion of the length of the bolt element 10. FIG. 20 also clearly shows the ring recess 232 formed by the ring nose 64 of the die button 54. It will be noted that the panel material has been deformed so that it fills the concave fields such as 20 beneath the head of the bolt element 10 and that the collar 120 has been pushed radially into engagement with the threads immediately beneath the head of the bolt element 10. The radial thickness of the collar generally tapers from the base of the ring groove 232 towards the axial end of the deformed collar remote from the head portion 12 of the bolt element.

It should be pointed out that when using thicker sheet metal components 52, i.e. sheet metal components 52 where S is greater than 2.25 mm, a die button 54 is used of the same general shape as that shown in FIGS. 21 and 21A, and this results in the formation of a shape of the sheet metal in the region of engagement with the bolt element which corresponds precisely to that of FIG. 20, i.e. a collar is also formed in this case by plastic flow of the sheet metal as a result of the cooperation of the die button 54 and the setting head acting on the bolt element 10.

FIG. 22 shows to an enlarged scale a side view, partly in a longitudinal section, of the preferred design of the head portion 12 and the shaft portion 16 of the bolt element 10 in the region adjacent the head portion 12.

The concave fields 20, which can better be seen from the view of FIG. 23, as seen in the direction of the arrow XXIII in FIG. 22, are generally sector-shaped and differ somewhat from the generally square shaped fields 20 shown in FIG. 1. Here there are six ribs 22 with the radial portions of the ribs 22 which bound the fields 20 tapering slightly in the radial direction away from the axis 50 of the bolt element 10. Again, the ribs 22 have portions which extend axially along the shaft portion 16 of the bolt element 10, and indeed over a length L which depends on the precise size of the bolt and which, for example, for a 5 mm metric bolt, would be equal to 0.5 mm.

The thread 14 of the bolt is rolled onto the shaft portion 16 of the bolt element after formation of the remainder of the bolt element by cold heading. It will be noted that the thread which is intended to receive the nut has the diameter G but is continued in the region 234 over approximately three thread turns, in a region of the shaft of a slightly greater diameter H. On insertion of the bolt the collar is brought into engagement with the thread in the portion 234, i.e. with the threads in the region of a greater diameter H. It is also possible to execute the threads in the region 234 of greater diameter so that they are somewhat harder than the rest of the threads. This can be done by heat treatment which is known per se as described in connection with the hardening of the first thread turns adjacent the tip of the bolt in the tip pierce embodiment. This is shown in more detail in FIG. 24, which shows a partial longitudinal section of a component assembly comprising the bolt element 10 installed in a sheet metal component 52, with a further sheet metal component 236 placed onto the sheet metal component 52 and secured to it by a nut element 238 which engages with the thread cylinder 14 of the shaft portion 16 of the bolt element 10.

FIG. 24 also clearly shows the ring recess 232 provided in the sheet metal component 52 and the collar 120 after it has been radially deformed to engage with 2 to 2½ threads in the region 234.

It will be noted that the further sheet metal component 236 has a central aperture 240 which fits over the radially deformed collar 120 with a slight clearance 250 being left between the rim of the aperture 240 and the collar 120. The nut 238 is a typical nut used nowadays in the motor industry and has an integral flange 242 for load spreading. It also has a chamfer 246 adjacent the threaded portion of its bore. In it usual way it also has a polygonal outer surface 248 for the application of a spanner or wrench.

Despite the fact that the ring groove 232 represents a void there is still more than adequate contact area of the load transmitting part between the nut and the bolt element so that surface pressures are kept well within the value at which a permanent deformation of the components could be expected.

FIG. 25 is basically a diagram similar to FIG. 24 but showing the situation in which the further sheet metal component 236 is eccentrically positioned relative to the axis 50 of the bolt element (not shown) rather than concentrically positioned as in FIG. 24. This eccentric positioning manifests itself by a larger gap 250 on one side of the bolt element than is the case in FIG. 24. Such eccentric arrangements are to be expected in practice because of tolerance considerations, particularly when the further sheet metal component 236 has to fit over more than one bolt element 10. It has been shown that the surface pressures within the clamped assembly comprising the nut, the bolt and the two sheet metal components can be kept within acceptable limits within the normal tolerances to be expected with respect to eccentricity and hole size. Interestingly, this is also achieved with head diameters of the bolt elements of favourable size in comparison to other known fasteners.

It can also be seen from FIGS. 24 and 25 that there is no thinning of the sheet metal component 52 within the clamped region and it can also be seen that there is good engagement between the sheet metal component 52 and the whole of the underside of the head portion 12 of the bolt element 10. In addition, it can be seen that the collar 120 extends axially beyond the surface of the sheet metal component 52 opposite to the head of the bolt element. This extended engagement over a substantial axial length of the bolt and within a plurality of thread turns ensures that the bolt element has extremely good resistance to both push out and lever out. It also has extremely good resistance to twist out because the fields 20 are well filled by the panel material 52 so that there is full engagement between the material of the sheet metal component 52 and the ribs 22, which generates this resistance to twist out.

It will be noted that the same reference numerals are used in all Figures to designate common parts or parts having a common function.

It is particularly favourable when the setting head or the method of German patent application P 44 29 737.8 is used for the insertion of the bolt element in accordance with the present application.

Furthermore, elements in accordance with the present invention will typically be formed of a middle carbon steel, e.g. a 35B2 medium carbon steel in accordance with German Industrial Standard DIN 1654 equivalent to an S 1035 steel in the USA.

The invention claimed is:

1. Method of joining a in the form of a bolt element, fastener element (10), having a head portion (12), a recess (20) under said head portion, a shaft portion (16) and at least one radial groove formed as a thread around the shaft portion, to a sheet metal component (52) by forming a hole in said sheet metal component in such a way that a collar (120) of material is formed at the side of the sheet metal component remote from the head portion of said fastener element, with the material of said collar (120) being subsequently deformed radially inwardly into said radial groove (28) by a die button, wherein a die button is used having a ring-shaped projection provided at its end face surrounding a tapered recess (112) and having sloping flanks (222,226) for pressing said sheet metal component upwardly into said recess (20) provided under said head portion (12) of said fastener element (10) and radially inwardly towards said shaft portion (16) into said radial groove (28) in the transition from said head portion (12) to said shaft portion (16).

2. Method in accordance with claim 1, wherein a base portion (113) of said tapered recess (112) serves to define the axially outermost end of said collar (120) when deformed into engagement with said element.

3. Method in accordance with claim 2, including the steps of
guiding the fastener element by means of a setting head through the sheet metal component (52), with an end (100) of said shaft portion remote from the head portion (12) being at the front, and with the sheet metal component (52) being pierced by the end (100) of the shaft portion (16) under the action of the setting head (38) thus forming a hole in the sheet metal component (52) on penetration thereof by said end (100) with the formation of said collar (120) and the ejection of a slug (116), and
broadening the hole formed in the sheet metal part (52) by the pushing through of a thread (14) formed at the end of the shaft portion (16) opposite the head portion of the bolt element, with the simultaneous dilation of the collar (120) which is located around the hole on the die side.

4. Method in accordance with claim 3, wherein said collar (120) which is formed during the piercing of said sheet metal component and which surrounds said hole at the die side is dilated as said shaft portion is pushed through said hole.

5. Method in accordance with claim 3 wherein the end (100) of the shaft portion (16) remote from the head portion (12) is used not only to push out the slug (116) from the sheet metal component (52), but rather also to generate at least one substantially radially directed cut or tear in the rim of the hole.

6. Method in accordance with claim 3, wherein the piercing of said sheet metal component is effected using a bolt element (10) which has a projecting spigot (101) at its end (100) remote from the head portion (12), with said projecting spigot having a diameter which is somewhat smaller than the core diameter of the thread.

7. Method in accordance with claim 6, wherein a conically divergent portion of said projecting spigot (101) adjacent said thread is used for initial dilation of said hole.

8. Method in accordance with claim 7, wherein shape features (106) provided at said projecting spigot (101) are used to exert a cutting action at the rim of said hole.

9. Method in accordance with claim 1, wherein the step of deforming the material of said collar radially inwardly into said radial groove comprises deforming the material of said collar radially inwardly into one or more thread turns (28) on the shaft portion of the element, said one or more thread turns forming said radial groove.

10. A method of attaching a fastener element in the form of a bolt element to a plastically deformable metal panel, said fastener element including a shank portion and an integral head portion extending radially from one end of said shank portion, and said shank portion including a radial groove formed as a thread around the shank portion generally adjacent said head portion, said method comprising the following steps:
forming an opening in said panel having a diameter generally equal to or greater than said fastener element shank portion, but less than said head portion, deforming said panel surrounding said panel opening into a generally cone-shaped portion projecting from said panel having a minor diameter at said panel opening, disposing said fastener element shank portion through said panel opening from a side of said panel opposite said projecting cone shaped portion, then deforming said panel cone-shaped portion into a generally tube-shaped portion closely conforming said fastener element shank portion, thereby supporting said shank portion, and using a die button having a tapered recess engaging an outer side of tube-shaped portion to deform said tube-shaped portion radially inwardly into said shank portion radial groove, thereby preventing withdrawal of said fastener from said panel opening.

11. The method of attaching a fastener element to a panel in accordance with claim 10, wherein said fastener element shank portion includes a generally cylindrical free end portion having a generally smooth external surface, said method including driving said fastener element free end portion against said panel, thereby generally simultaneously deforming said panel to form said cone-shaped portion and piercing a slug from said panel, forming said panel opening.

12. The method of attaching a fastener element to a panel in accordance with claim 11, wherein said fastener element cylindrical free end portion has a diameter less than said shank portion and said shank portion including a generally conical portion extending inwardly from said shank portion to said cylindrical free end portion, said method including driving said cylindrical free end portion of said shank portion through said panel, then driving said conical portion of said fastener element shank portion through said panel opening, thereby enlarging said panel opening and substantially simultaneously drawing said conical panel portion into said tubular-shaped panel portion, then deforming said tubular panel portion radially inwardly into said shank portion radial groove.

13. The method of attaching a fastener element to a panel in accordance with claim 12, wherein said cylindrical free end portion of said shank portion includes generally longitudinally extending spaced grooves having relatively sharp edges adjacent the cylindrical surface of said cylindrical end portion, said method including driving said cylindrical end portion against said panel, tearing and piercing said panel, and forming said generally conical panel portion having a torn discontinuous edge surrounding said panel opening, then deforming said discontinuous edge radially inwardly into said radial groove in said shank portion.

14. The method of attaching a fastener element to a panel in accordance with claim 12, wherein said shank portion is externally threaded and said radial groove comprises at least one male thread generally adjacent said head portion, said method including deforming said panel tubular portion radially inwardly into the groove defined by said one male thread.

15. The method of attaching a fastener element to a panel in accordance with claim 12, wherein said radial groove in said shank portion is spaced from said head portion, said method including deforming the end of said panel tubular portion radially inwardly into said radial groove in said shank portion.

16. The method of attaching a fastener element to a panel in accordance with claim 10, wherein said fastener element head portion includes a groove generally adjacent said shank portion, said method including deforming said conical panel portion spaced from said panel opening into said groove in said head portion substantially simultaneously with deforming said panel portion radially inwardly into said radial groove in said fastener element shank portion.

17. The method of attaching a fastener element to a panel in accordance with claim 10, wherein said shank portion of said fastener element includes a first radial groove immediately adjacent said head portion and said shank portion is externally threaded including a first plurality of male threads adjacent said first radial groove having a diameter greater than the remaining threads on said shank portion, said method including deforming said generally tube-shaped panel portion radially inwardly into said first radial groove and the radial grooves defined by said first plurality of male threads.

18. The method of attaching a fastener element to a panel in accordance with claim 17, wherein said method includes hardening said first plurality of male threads adjacent said radial groove prior to attachment of said fastener element to said panel.

* * * * *